United States Patent [19]

Hazenbroek

[11] Patent Number: 4,577,368
[45] Date of Patent: Mar. 25, 1986

[54] APPARATUS FOR CUTTING APART POULTRY WINGS

[76] Inventor: Jacobus E. Hazenbroek, Burg de Zeeuwstratt 52, Numansdorp, Netherlands

[21] Appl. No.: 644,514

[22] Filed: Aug. 27, 1984

[51] Int. Cl.[4] .............................................. A22C 21/00
[52] U.S. Cl. ........................................................ 17/11
[58] Field of Search ........................................ 17/11, 52

[56] References Cited

U.S. PATENT DOCUMENTS 4,207,653  6/1980  Gasbarro .................................. 17/11
4,480,353  11/1984  Martin et al. ........................ 17/52 X

*Primary Examiner*—Willie G. Abercrombie
*Attorney, Agent, or Firm*—Thomas & Kennedy

[57] ABSTRACT

Poultry wings are automatically cut into pieces by mounting them in troughs formed in the periphery of a wheel and moving them into sliding contact with rigid guide bars which, in conjunction with the shape of the troughs, guide their elbow joints and flipper joints into severing contact with cutting blades.

8 Claims, 5 Drawing Figures

APPARATUS FOR CUTTING APART POULTRY WINGS

TECHNICAL FIELD

This invention relates to methods and apparatus for cutting apart poultry wings in an automated manner.

BACKGROUND OF THE INVENTION

Heretofore, poultry wings, particularly those of chickens, have been cut into sections for the retail trade such as to the fast food and restaurant industries. The cutting has been done manually by severing the wings at the elbow joint where the drumette and middle sections are joined and by severing the wing where the middle section and flipper are joined. This manual process has proven to be expensive due to the high cost of labor and the risk of personal injury.

To overcome problems attendant with the manual cutting of poultry wings, attempts have been made to provide automated wing cutting apparatus. One such apparatus is disclosed in U.S. Pat. No. 4,207,653 wherein a rotatable drum-like, wing retaining means is provided with circumferentially spaced axial grooves contoured to receive poultry wings. These axially spaced grooves are intersected by axially spaced annular slots and stationary knife blades are positioned within the slots. The blades are arranged to cut through the wing elbow joints and wing flipper joints of the wings carried in the grooves of the rotating drum. Resilient bands are located within other annular slots of the drum which are located beside those slots in which the knife blades are housed. The resilient bands serve to straddle both the elbow joint and the flipper joint and to bias them into the grooves of the drum so that clean joint cuts may be effected by the knives.

Though the apparatus of the type just described does possess advantages over manual cutting procedures, the prior art devices have been beset with one particular problem, namely that of severing the flipper joint at the proper location. Once the drumette has been severed from the rest of the wing by cutting engagement with a first knife blade, the resilient bands then acting upon the middle section and flipper of the portion of the wing still present in the slot of the rotating drum tends to seat the flipper joint in accordance with the size and shape of the drumette and flipper. Therefore, where a middle section is larger than normal with respect to an attendant flipper, more force is applied to it by the resilient band in contact with it, thereby tending to move the flipper such that the cut in the flipper joint is made not directly into the joint but beside the joint and partially into the drumette. Thus, the accuracy of the flipper joint cut has been dependent upon both the size of the midsections and flippers of individual wings and also, to some extent, upon whether the wing is a right hand wing or a left hand wing. Accordingly, a need remains for a method and apparatus for cutting poultry wings in an automated manner which overcomes the problems and limitations of the methods and apparatus of the prior art. It is the provision of such methods and apparatuses to which the present invention is accordingly directed.

SUMMARY OF THE INVENTION

Briefly described, the present invention comprises apparatus for cutting poultry wings which includes a wheel mounted for rotary movement about its axis, with the wheel periphery formed with two annular slots and with a plurality of circumferentially spaced troughs in which wings of poultry, such as chicken wings, are placed for cutting. A cutting blade is positioned in each of the slots. The troughs of the wheel each are formed with a ridge and a valley, and the two annular slots of the wheel intersect the troughs, with one slot intersecting the troughs at their ridges and the other slot intersecting the troughs at their valleys.

With this arrangement, a method is provided for cutting apart poultry wings at the elbow joint joining a drumette with a middle section and at the flipper joint joining the middle section with a flipper. The method comprises the steps of mounting the wings to a rotatable wheel support with the elbow joint overlying a support ridge and the flipper joint nestled within a support valley located adjacent the ridge. The elbow joint is carried by the wheel into cutting engagement with a cutting blade by applying force to the drumette and to the middle section so as to force the drumette and middle section against opposite sides of the support ridge while advancing the support with respect to the cutting blade until the elbow joint is severed. The method further comprises the step of guiding the flipper joint into cutting engagement with another cutting blade by applying force directly to the back of the flipper joint so as to force the flipper joint against the walls of the valley while advancing the support with respect to the other cutting blade until the flipper joint is severed. The forces aplied to the wing segments are applied by rotating the wheel so as to bring each drumette into sliding contact with a first guide bar and the middle section into contact with a second guide bar thereby forcing the drumette and middle section against the ridge walls while advancing the elbow joint into severing engagement with the first cutting blade. The wheel is then rotated with the back of the flipper joint in sliding contact with the edge of a second guide bar thereby forcing the flipper joint against the valley walls while advancing the flipper joint into severing engagement with a second cutting blade.

Thus, it is an object of this invention to provide a method and an apparatus for automatically cutting apart the sections of poultry wings at the joints of the wings, with cuts being made through the joints.

Another object of the invention is to provide a method and apparatus that efficiently cuts apart the segments of poultry wings, whereby the wings are accurately cut at their joints, and whereby an operator can safely and rapidly load wings into a cutting apparatus.

Other objects, features and advantages of the invention will become apparent upon reading the following specification, when taken in conjunction with the accompanying drawings.

DETAILED DESCRIPTION

Figure 1:
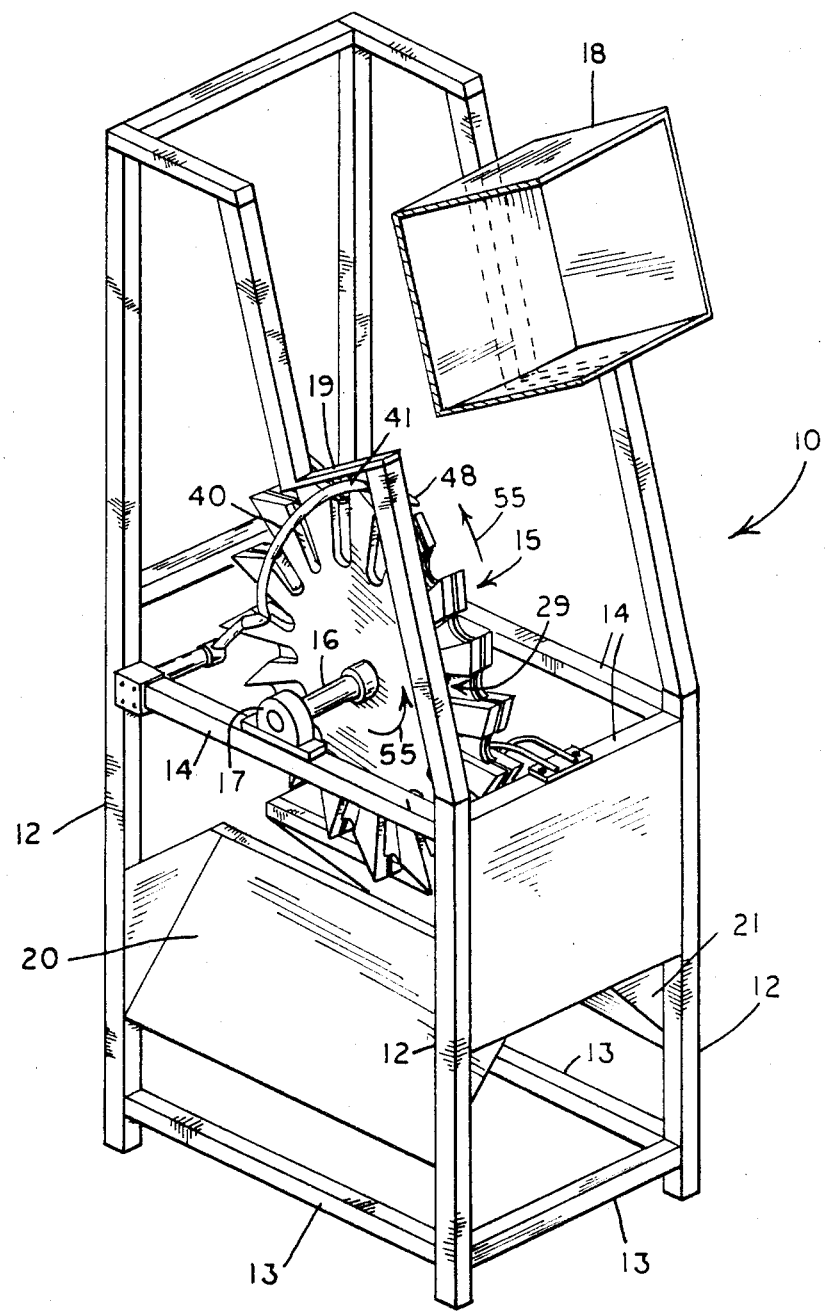
FIG. 1 is a perspective view of an apparatus embodying principles of the invention which apparatus may be employed in practicing a method of the invention.

Referring now in more detail to the drawings, in which like numerals refer to like parts throughout the several views, FIG. 1 illustrates apparatus 10 for cutting apart the segments of poultry wings which comprises a frame that includes upright legs 12, lower horizontal beams 13 and upper horizontal beams 14. A wheel or drum-like element 15 is mounted for rotary movement about a generally horizontal axis by means of a wheel axle 16 journaled in the bearings of pillow blocks 17 mounted atop the upper beams 14. A supply bin 18 is removably mounted atop inclined frame members 19 above and to the rear of the wheel 15. Two deflector plates 20 and 21 are mounted to the frame beneath the wheel. An electric motor and a power train operatively coupling the motor with the wheel axle 16 are also mounted to the frame, but are hidden from view behind wheel 15 in FIG. 1.

Figure 2:
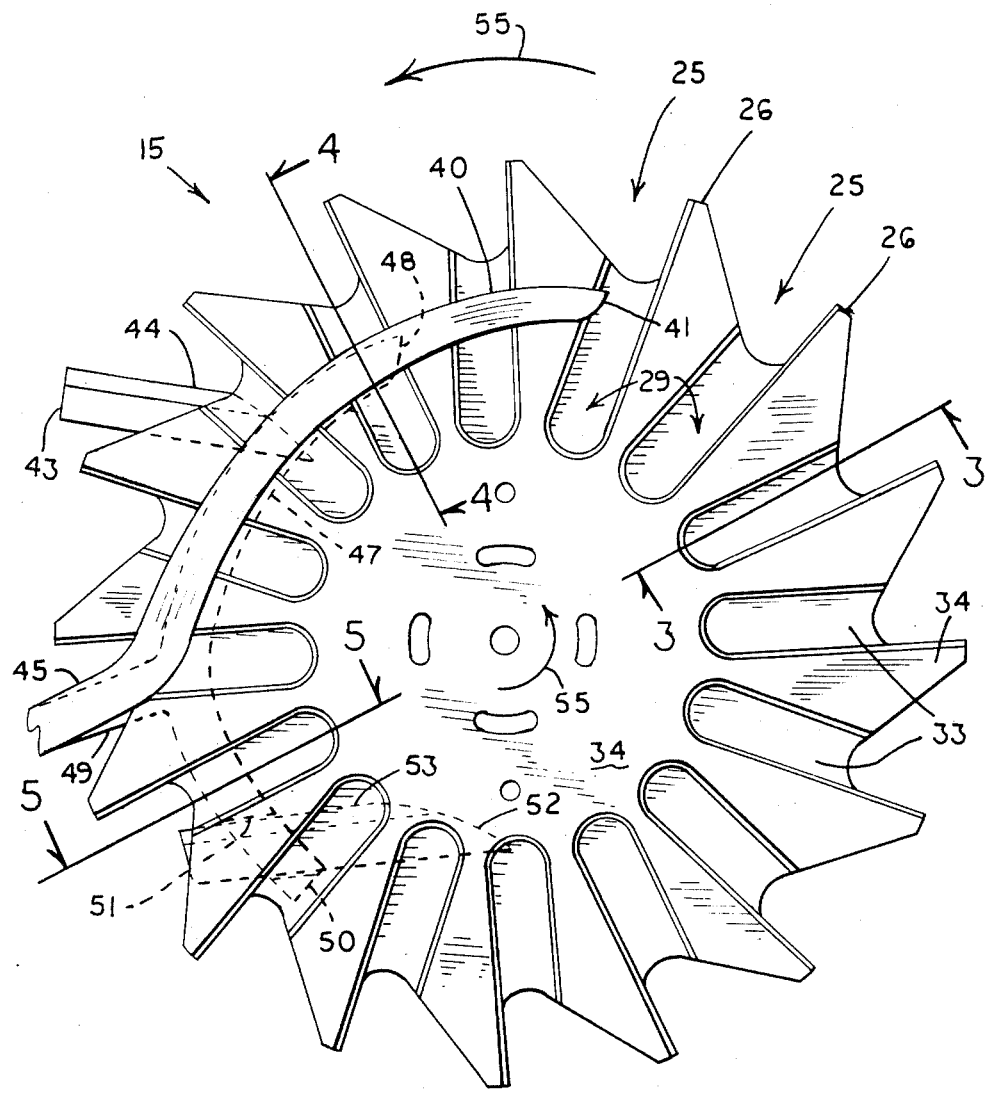
FIG. 2 is a side elevational view of the wheel component of the apparatus illustrated in FIG. 1 and of guide bars and cutting blades associated therewith.

As illustrated in FIG. 2, the wheel 15 is formed with a set of circumferentially spaced troughs 25 that extend laterally or generally parallel to the wheel axle 16 between laterally spaced, raised lands 26 and 26' (FIG. 5) with land 26' having a smaller radius than land 26. A first annular slot 28 is formed in the periphery of the wheel so as to extend down into each of the lands 26 as well as into inner surface or floor of each trough located between the lands 26. Similarly, a second annular slot 30 is formed in the wheel periphery to extend down into each of the lands 26' as well into inner surface or floor of each trough. The inclined surfaces 31 and 35 of each trough located between adjacent lands 26 and 26' is formed in a Z-shape with a ridge 38 and a valley 35 to accomodate a bird wing laid therein as shown in broken outline form in FIGS. 3–5. Each trough 25 has vertical side surface 33 forming the upright floor of a recess 29 in wheel face 34 which recess 29 terminates at ridge 38. Each trough also has an inclined surface 35 which extends downwardly along the other side of the ridge 38 to a trough floor 31. The floor 31 inclines upwardly to the other wheel face 37.

A rigid guide bar 40 is mounted to the apparatus frame closely adjacent to the wheel face 34. The guide bar 40 extends from a tip 41 (FIGS. 1 and 2) arcuately beyond a cutting blade 43 which is rididly mounted to the apparatus frame with a portion of its cutting edge 44 located within the slot 28. The blade 43 is mounted at an angle such as to effect an inside-out cut. The guide bar 40 extends from tip 41 to the blade 43 generally equidistantly from the wheel axis through axle 16, as may be seen by reference to FIG. 2, and then to an outturned mounting extension 45. Another rigid guide bar 47 is rigidly mounted to the apparatus frame located within the bounds of slot 30. This guide bar extends from a tip 48 beyond an outturned mounting extension 49 to a bar end 50. The guide bar 47 is provided with slot 51 adjacent end 50 in which another cutting blade 52 is mounted with a cutting edge 53 oriented so as to effect an outside-in cut. It should be specifically noted that the guide bar 47 arcs inwardly somewhat in a spiral-like manner so as to decrease its radius from the wheel axis as it approaches the blade 52. For clarity, blades 43 and 52 have been illustrated only in FIG. 2.

Figure 3:
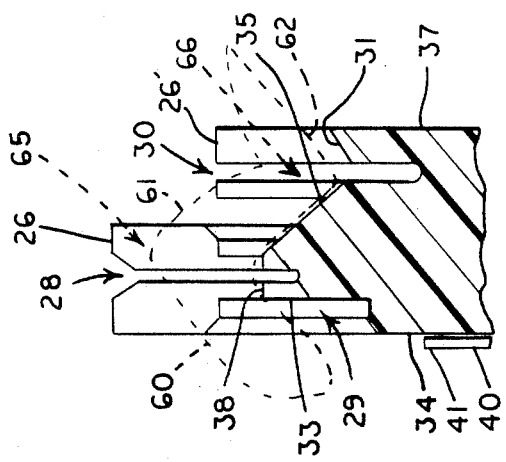
FIG. 3 is a cross-sectional view of a portion of the apparatus illustrated in FIG. 2 taken along plane 3—3.

For operation, the wheel 15 is driven by motor, hidden by the wheel in FIG. 1, in the direction of arrow 55. A worker stands in front of the apparatus (to the right in FIG. 2) and loads the wheel with poultry wings which are available by being loosely disposed within the supply bin 18. Each wing comprises a drumette 60, a middle section 61 and a flipper or tip 62. As illustrated in FIG. 3, whether or not the wings are right-handed or left-handed, each wing is placed within a trough 25 of the wheel with its drumette 60 loosely mounted partially within a recess 29 at the side of the wheel, its middle section 61 loosely mounted atop inclined surface 35, and its flipper 62 positioned over the inclined surface 31. It should be seen that in this configuration the elbow joint 65 is located generally over the trough ridge 38 while the flipper joint 66 is positioned over the valley floor at the intersection of inclined surfaces 31 and 35.

Figure 4:
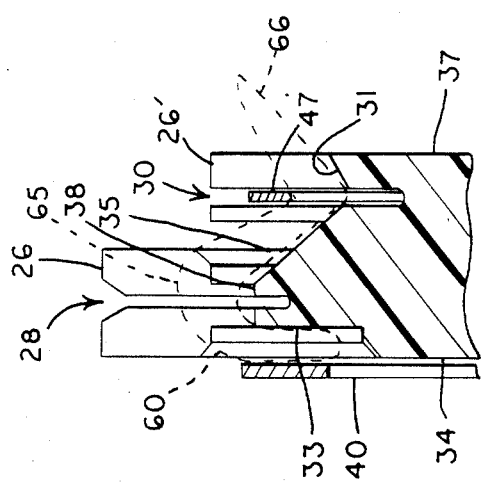
FIG. 4 is a cross-sectional view of a portion of the apparatus shown in FIG. 2 taken along plane 4—4.

As illustrated in FIG. 4, with rotation of the loaded wheel, each wing is brought into sliding contact with the two substantially stationary guide bars 40 and 47, first with guide bar 40 and next with guide bar 47. Specifically, the guide bar 40 first engages the drumette 60 of each wing and urges it downwardly and inwardly into the side recess 29 against surface 33. The side of the guide bar 47 facing the guide bar 40 then contacts the middle section 61 of the wing at a position closely adjacent the flipper joint 66 and in doing so forces the middle section downwardly and into contact with the inclined surface 35. This is the position illustrated in FIG. 4 just prior to engagement of the wing with the cutting blade 43. Thus, the joint 65 is stretched about ridge 38, tending to open the joint. With the wing so forced against the opposite walls of the trough ridge 38, the elbow joint 65 is centered on the ridge 38 so as to be radially aligned with slot 28. Thus, as the wheel passes over the cutting blade 43, the blades severs the wing through the elbow joint with a cutting action in the relative direction away from the axis of the wheel 15 radially outwardly from the axis, to cut into the V-shape of the drumette 60 and middle section 61 of the wing. Continued rotation of the now cut drumette 60 with the wheel 15 beyond the guide bar 40 and its mounting portion 45 frees the drumette whereupon the drumette falls downwardly onto deflector plate 20 (FIG. 1) and into an unshown collection bin upon the floor beside the apparatus.

Figure 5:
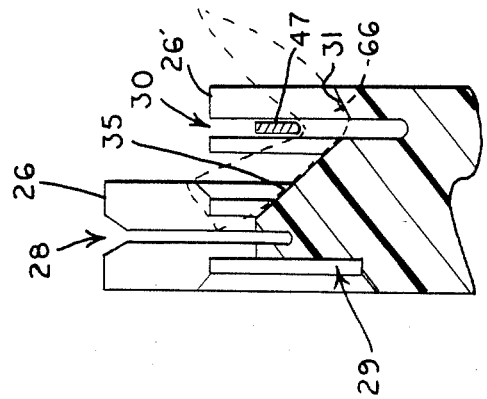
FIG. 5 is a cross-sectional view of a portion of the apparatus shown in FIG. 2 taken along plane 5—5.

With the drumette severed and removed from the remainder of the wing, the guide bar 47, as it arches inwardly towards the wheel axis, exerts downward pressure against the back of the flipper joint 66, thereby urging it flush against the valley floor surfaces 35 and 31 of the trough, as shown in FIG. 5. It should be noted that this is done with the flipper joint 66 centered in slot 30 regardless of the size of the remainder of the wing middle section and flipper and whether or not it is a right-handed wing or left-handed wing. This is because the drumette section has now been removed leaving only a single guide bar acting on the remainder of the wing and acting specifically on the back of the V-shaped flipper joint. In this manner, the flipper joint is centered within the slot 30 as shown in FIG. 5. As the wing segments move beyond the plane 5—5 (FIG. 2), the wing engages the cutting blade 52 which effects an outside-in cut of the joint. This is a cutting action in the relative direction toward the axis of the wheel 15 radially inwardly toward the axis, to cut into the V-shape of the middle section 61 and flipper 62. The now severed middle section 61 and flipper 62 are each free to fall from the wheel downwardly against deflector 21 and into other, unshown collection bins. Continued rotation of the wheel 15 presents an empty trough 15 at a loading position for the next successive operation.

It thus is seen that an apparatus and method for cutting poultry wings is provided which overcomes problems and limitations of those of the prior art. It should, however, be understood that the just described embodiment merely illustrates principles of the invention in a preferred form. Many modifications, additions, and deletions may, of course, be made thereto without departure from the spirit and scope thereof, as set forth in the following claims.

What is claimed is:

1. Apparatus for cutting poultry wings having an elbow joint joining a drumette with a middle section and a flipper joint joining the middle section with a flipper, and with said apparatus comprising a wheel mounted for rotary movement with the wheel periphery having a plurality of circumferentially spaced troughs each formed with an axially spaced ridge and valley, and at least two annular slots formed in said wheel periphery with one slot passing through the trough ridges and the other slot passing through the trough valleys:

a first cutting blade positioned within said one slot;

a second cutting blade positioned within said other slot;

a first guide bar mounted to one side of said one slot and the path of travel of said trough ridges, and a second guide bar mounted on the other side of the path of travel of said one slot and in said other slot and over the path of travel of said trough valleys, whereby the first and second guide bars first guide the elbow joint of a wing positioned in a trough into cutting engagement with the first cutting blade by simultaneous sliding contact with the drumette and middle section, respectively, so that the drumette is cut away from the middle section of the wing by the first cutting blade, and then after the drumette has been cut away from the middle section of the wing the second guide bar engages the back of the flipper joint and guides the front of the flipper joint into cutting engagement with the second cutting blade by sliding contact with the back of the flipper joint.

2. The apparatus of claim 1 wherein said wheel is mounted for rotary movement in a given direction and wherein said second cutting blade is mounted downstream from said first cutting blade.

3. The apparatus of claim 1 wherein said second guide bar has a slot in which said second cutting blade is mounted.

4. The apparatus of claim 1 wherein said first and second guide bars are rigid.

5. The apparatus of claim 4 wherein said wheel is mounted for rotary movement about an axis, and wherein said second guide bar spirals inwardly about said wheel axis to apply increasing force to the flipper joint of the poultry wings carried by the wheel until the flipper joint reaches the second cutting blade.

6. Apparatus for cutting apart poultry wings comprising a wheel, means for rotating said wheel about the center axis of said wheel, a plurality of equally spaced troughs formed about the periphery of the wheel receiving poultry wings therein, at least two annular slots formed in the periphery of said wheel with each trough intersecting said slots, a plurality of recesses formed in a side surface of the wheel adjacent the periphery of the wheel with each recess intersecting a trough with each recess sized and shaped to receive a drumette of a poultry wing, each said trough having its inner surface formed with a ridge located adjacent its recess for receiving the joint between the drumette and the middle section of a wing and a valley located away from its recess for receiving the joint between the middle section and the flipper of a wing, with a first one of said annular slots intersecting each trough at its ridge and the second one of said annular slots intersecting each trough at its valley, a first stationary guide bar positioned in juxtaposition with the side surface of said wheel at said recesses, a second stationary guide bar extending into said second one of said annular slots, a first stationary cutting knife extending into said first annular slot and angled to cut outwardly of its annular slot through the joint between the drumette and the middle section of the poultry wings carried in said troughs, a second stationary cutting knife extending into said second annular slot and angled to cut inwardly of its annular slot through the joint between the middle section and the flipper of the poultry wings carried in said troughs.

7. The apparatus of claim 6 and wherein the said second cutting knife is offset from said first cutting knife circumferentially about said wheel in the direction of rotation of said wheel.

8. The apparatus of claim 6 and wherein said second guide bar is offset from said first guide bar circumferentially about said wheel in the direction of rotation of said wheel.

* * * * *